Figure 1:
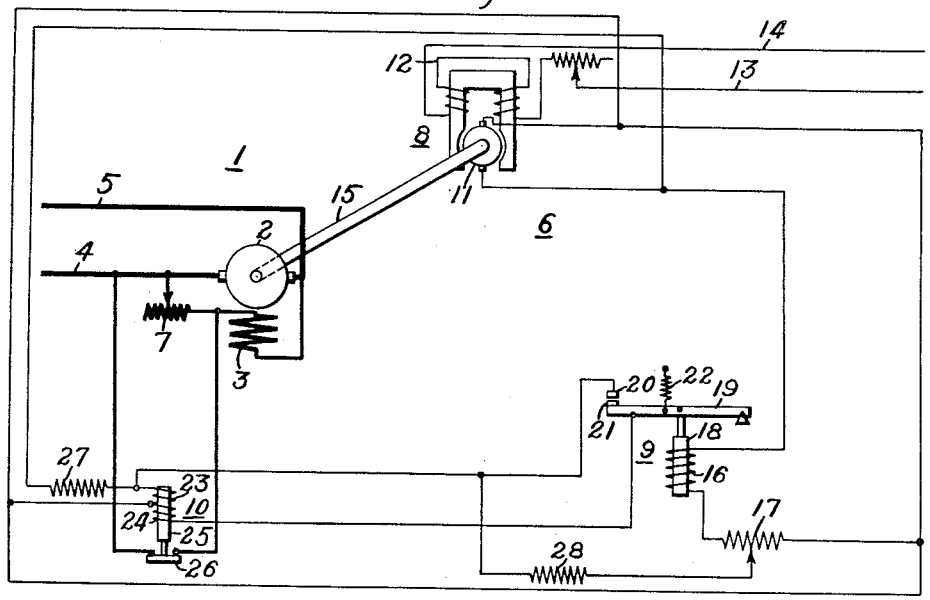

May 27, 1924.

C. A. BODDIE

SPEED REGULATOR SYSTEM

Filed Dec. 3, 1919

1,495,947

WITNESSES:
J. A. Helsel
W. B. Wells.

INVENTOR
Clarence A. Boddie.
BY
Wesley G. Carr
ATTORNEY

Patented May 27, 1924.

1,495,947

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA,

SPEED-REGULATOR SYSTEM.

Application filed December 3, 1919. Serial No. 342,177.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Speed-Regulator Systems, of which the following is a specification.

My invention relates to regulator systems and particularly to speed-regulator systems for governing electric motors.

One object of my invention is to provide a regulator system that shall maintain the speed of a motor substantially constant in a simple and efficient manner and that shall be substantially free from any so-called hunting action.

A further object of my invention is to provide a regulator system of the vibratory type either for varying the excitation of a direct-current motor to maintain constant speed or for varying the resistance of the rotor circuit of an alternating-current motor to maintain constant motor speed.

In many instances, it is desirable to operate a motor, either of the direct-current or of the alternating-current type, much closer to constant speed than can be effected by the inherent characteristics of the motor. Thus, in operating many machines in such service as is encountered in the cotton and in the paper industry, it is practically essential to provide some means for so regulating the propelling motors as to operate the machines at constant speed.

In practicing my invention, a vibratory magnet is operated either for varying the excitation of a direct-current motor to maintain its speed constant or for varying the resistance included in the rotor circuit of an alternating-current motor to maintain constant motor speed.

In regulating the speed of a direct-current motor, a generator of any suitable type is operated in accordance with the motor speed for governing a magnet to control the excitation of the motor. The magnet is operated in accordance with the generated voltage and controls a differential relay for intermittently short-circuiting a resistor which is included in the field-winding circuit of the motor. Moreover, the magnet so controls means for varying a resistor included in its energizing circuit that a vibratory or intermittent operation of the magnet is effected to prevent any hunting action.

In regulating the speed of an alternating-current motor, a generator of any suitable type is operated in accordance with the motor speed for controlling an electro-magnet which, in turn, controls the resistance included in the rotor circuit of the motor. The electromagnet controls a switch for short-circuiting resistors which are normally included in the rotor circuit and for varying a resistor included in the energizing circuit of the electro magnet in order to effect a vibratory action of the magnet and, consequently, to prevent any hunting action.

Figure 2:
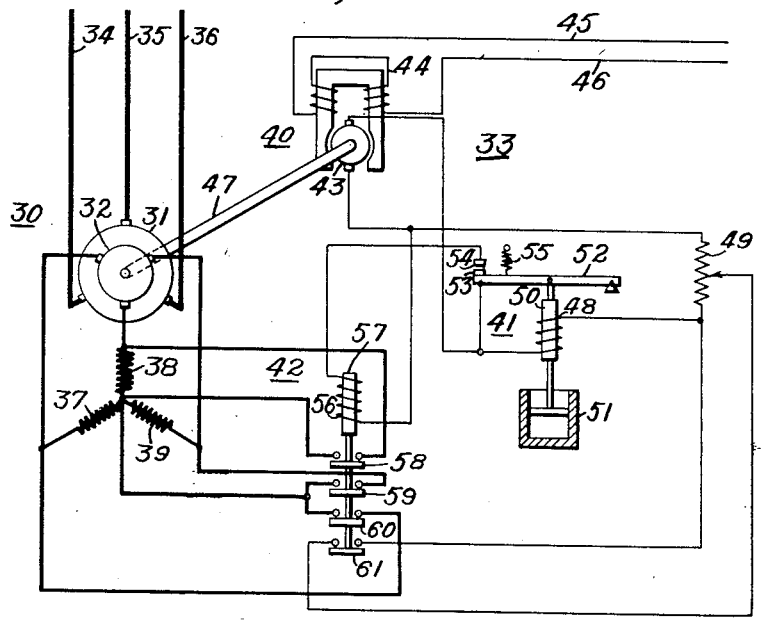

In the accompanying drawing, Figure 1 is a diagrammatic view of a regulator system for governing the speed of a direct-current motor and constructed in accordance with my invention. Fig. 2 is a diagrammatic view of a regulator system constructed in accordance with my invention for governing the speed of an alternating-current motor.

Referring to Fig. 1 of the drawing, a shunt-wound motor 1, comprising an armature 2 and a shunt field-magnet winding 3, is connected to a supply circuit comprising conductors 4 and 5 and is governed by means of a regulator 6. The shunt field-magnet winding 3 is connected in circuit with an adjustable resistor 7, which is intermittently short-circuited by means of the regulator 6, for so varying the excitation of the motor 1 as to maintain its speed constant.

The regulator 6 embodies a generator 8, of any suitable type, a vibratory electromagnet 9, which is controlled by the generator 8, and a differential relay 10 which is governed by the vibratory magnet 9. The generator 8 comprises an armature 11 and a field-magnet winding 12 which is connected to an auxiliary supply circuit comprising conductors 13 and 14. The generator 8 is connected to the motor 1 in any suitable manner, as by means of a shaft 15, in order that it may be operated in accordance with the speed of the motor.

The vibratory electromagnet 9 comprises a winding 16 which is connected, in series with a resistor 17, across the armature 11 of the generator. The winding 16 governs a core armature 18 which is pivotally connected to a contact arm 19 for controlling two main contact members 20 and 21. A spring 22 is provided for biasing the contact arm 19 to effect engagement between the contact members 20 and 21.

The differential relay 10 comprises two differential windings 23 and 24, which control the operation of a core armature 25 and a switch member 26. The switch member 26 serves to open a short-circuit across the resistor 7 when the two windings 23 and 24 of the relay are simultaneously energized. The winding 23 is connected, in series with a resistor 27, across the armature 11 for maintaining the switch member 26 in its closed position when the contact members 20 and 21 of the magnet 9 are disengaged. The winding 24 is connected, in series with the resistor 27, across the armature 11 upon engagement of the contact members 20 and 21. Thus, upon engagement of the contact members 20 and 21 of the magnet 9, the differential relay 10 is released to open the short-circuit across the resistor 7 and, consequently, to decrease the excitation of the motor to increase its speed. Upon separation of the contact members 20 and 21, the differential relay is energized solely by the winding 23 and, consequently, the switch member 26 is operated to short-circuit the resistor 7. Thus, the excitation of the motor 1 is increased to increase the motor speed.

When the contact members 20 and 21 are disengaged, a portion of the resistor 17 and a resistor 28 are connected in parallel to the winding 23 of the differential relay across the armature 11 of the generator. Consequently, when the contact member 21 is moved into engagement with the contact member 20, the winding 24 is connected in parallel with the winding 23 and the resistors 28 and 17 to reduce the potential drop across a portion of the resistor 17. Thus, the energization of the winding 16 is increased by the reduction in potential across a portion of the resistor 17 to effect separation of the contact members and, accordingly, to produce a vibratory operation of the magnet.

If the motor 1 is operated above normal speed, the voltage generated by the generator 8 is raised to increase the energization of the magnet 9. The increased energization of the magnet 9 effects separation of the contact members 20 and 21 to open the circuit through the winding 24. Thereupon, the winding 23 operates the switch member 26 to short-circuit the resistor 7 which is included in circuit with the field winding 3. Thus, the excitation of the motor 1 is increased to decrease the speed of the motor. Upon separation of the contact members 20 and 21, the energization of the winding 16 is decreased by reason of the opening of the short-circuit comprising the winding 24 which formerly obtained across a portion of the resistor 17. Thereupon, the contact arm 19 is raised to effect engagement of the contact members 21 and 20, and such operation is continued intermittently to short-circuit the resistor 7 at varying rates.

Referring to Fig. 2 of the drawing, an induction motor 30, comprising a stator 31 and a rotor 32, is governed by a regulator 33 to maintain constant motor speed. The rotor winding is connected to a three-phase supply circuit comprising conductors 34, 35 and 36 and the rotor is connected to three resistors 37, 38 and 39 which are controlled by the regulator 33.

The regulator 33 comprises a generator 40, of any suitable type which is operated by the motor 30, an electromagnet 41, which is operated in accordance with the voltage of the generator, and a switch 42 which is governed by the magnet 41. The generator 40 comprises an armature 43 and a field winding 44 which is connected across an auxiliary supply circuit comprising conductors 45 and 46. The armature 43 of the generator is mechanically connected to the rotor of the induction motor in any suitable manner, as by means of a shaft 47.

The electromagnet 41 comprises a winding 48 which is connected, through a resistor 49, across the armature 43 of the generator. The winding 48 operates a core armature 50 which is provided with a dash pot 51 for adjusting its operation and which is pivotally connected to a contact arm 52. The contact arm 52 carries a main contact member 53 which is adapted to engage contact member 54 when the arm is in a retracted position. A spring member 55 is provided for so biasing the contact arm 52 as to maintain the contact members 53 and 54 in engagement with each other when the energization of the electromagnet is reduced.

The switch 42 comprises a winding 56, which is connected across the armature 43, upon engagement of the contact members 53 and 54, and a core armature 57 which is governed by the winding 56. The core armature 57 is directly connected to four switch members 58, 59, 60 and 61. Upon operation of the switch 42, the switch members 58, 59 and 60 respectively short-circuit the resistors 38, 39 and 37 for decreasing the resistance included in the rotor circuits to increase the speed of the motor 30. The switch member 61 serves to short-circuit a portion of the resistor 49 in order to increase the energization of the magnet 41 and thus effect separation of the contact members 53 and 54. The above operation of the switch member 61, in short-circuiting a portion of the resistor 49, produces an intermittent or vibratory operation of the electromagnet.

If the motor 30 is operating above normal speed, the generator 40 produces a voltage above normal value which increases the energization of the electromagnet 41. Thereupon, the contact arm 52 is operated to effect separation of contact members 54 and 53 and de-energize the winding 56 of the switch 42. Consequently, the switch members 58, 59 and 60 open the short-circuits obtaining across the resistors 38, 39 and 37. Thus, the resistance included in circuit with the rotor winding is increased to reduce the motor speed to normal value. The electromagnet 41 continues such operation at varying rates in the manner of the ordinary Tirrill regulator, to govern the resistance included in the rotor-winding circuit and, accordingly, to control the motor speed.

Modifications in the system and arrangement and location of parts may be made within the spirit and scope of my invention, and such modifications are intended to be covered by the appended claims.

I claim as my invention:

1. In a speed-regulator system, the combination comprising a motor, a dynamo-electric machine operated in accordance with the speed of said motor, a magnet operated by said machine, means controlled by the magnet for varying the excitation of said motor, and means effective substantially simultaneously with the operation of said last named means for effecting a vibratory operation of said magnet.

2. In a speed-regulator system, the combination with a motor, a generator operated by, and in accordance with, the speed of said motor, and a magnet operated in accordance with the voltage of said generator, of a differential relay controlled by said magnet, means controlled by said relay for maintaining the speed of the motor substantially constant, and means controlled substantially simultaneously with the operation of the relay for effecting a vibratory operation of the magnet.

3. In a speed-regulator system, the combination with a motor, and a generator operated in accordance with the speed of the motor, of a magnet operated in accordance with the voltage of said generator, and relay means controlled by the magnet, means controlled by said relay for governing the speed of said motor, and means controlled simultaneously with the last named means for effecting a vibratory operation of the magnet.

4. In a speed-regulator system, the combination with a motor, a generator operated in accordance with the speed of the motor, and a magnet operated in accordance with the voltage of said generator, of a differential relay controlled by said magnet, means controlled by the differential relay for varying the excitation of the motor to maintain constant motor speed, and means operated substantially simultaneously with the operation of the relay for so varying the energization of the magnet as to effect its vibratory operation.

5. In a speed-regulator system, the combination with a motor having armature and field-magnet windings, a resistor in circuit with said field-magnet windings, and a generator operated in accordance with the speed of the motor, of a magnet operated in accordance with the voltage of said generator, a differential relay controlled by said magnet for short-circuiting said resistor at varying rates to maintain the speed of the motor constant, and means operated substantially simultaneously with the operation of the relay for effecting vibratory operation of the magnet.

6. In a speed regulator system, the combination comprising a motor, a generator operated in accordance with the speed of said motor, a magnet operated in accordance with the voltage of said generator, a control resistance connected in series relation therewith, a relay controlled by said magnet, and means connecting a portion of said control resistance in parallel relation to said relay for effecting a vibratory operation of the magnet.

In testimony whereof, I have hereunto subscribed my name this 29th day of November, 1919.

CLARENCE A. BODDIE.